United States Patent
Peramaki

(10) Patent No.: US 6,305,473 B1
(45) Date of Patent: Oct. 23, 2001

(54) VACUUM EXTRACTION APPARATUS AND PROCESS

(75) Inventor: Matthew Peramaki, Blaine, MN (US)

(73) Assignee: Leggette, Brashears and Graham, St. Paul, MN (US)

( * ) Notice: Subject to any disclaimer, the term of this patent is extended or adjusted under 35 U.S.C. 154(b) by 0 days.

(21) Appl. No.: 09/134,818

(22) Filed: Aug. 17, 1998

(51) Int. Cl.$^7$ .................................................... E21B 43/14
(52) U.S. Cl. ......................... 166/313; 166/370; 166/89.1
(58) Field of Search .................................... 166/306, 313, 166/369, 370, 372, 227, 89.1; 405/128, 52

(56) References Cited

U.S. PATENT DOCUMENTS

| | | |
|---|---|---|
| Re. 33,102 | 10/1989 | Visser et al. . |
| 4,183,407 | 1/1980 | Knopik . |
| 4,323,122 | 4/1982 | Knopik . |
| 4,593,760 | 6/1986 | Visser et al. . |
| 4,660,639 | 4/1987 | Visser et al. . |
| 5,032,042 | 7/1991 | Schuring et al. . |
| 5,050,676 | 9/1991 | Hess et al. . |
| 5,076,360 | 12/1991 | Morrow . |
| 5,172,764 | 12/1992 | Hajali et al. . |
| 5,197,541 | 3/1993 | Hess et al. . |
| 5,261,765 * | 11/1993 | Nelson ................................. 405/128 |
| 5,332,333 | 7/1994 | Bentley . |
| 5,358,357 | 10/1994 | Mancini et al. . |
| 5,435,666 | 7/1995 | Hassett et al. . |
| 5,441,365 | 8/1995 | Duffney et al. . |
| 5,560,737 | 10/1996 | Schuring et al. . |
| 5,586,836 | 12/1996 | Morrow . |
| 5,641,020 | 6/1997 | Cherry et al. . |
| 5,655,852 | 8/1997 | Duffney et al. . |
| 5,709,505 | 1/1998 | Williams et al. . |
| 5,868,523 * | 2/1999 | Nickell et al. ......................... 405/128 |
| 5,879,108 * | 3/1999 | Haddad ................................. 405/128 |
| 5,908,267 * | 6/1999 | Schuring et al. ..................... 405/128 |
| 5,961,438 * | 10/1999 | Ballantine et al. ................ 166/305.1 |

* cited by examiner

Primary Examiner—Frank Tsay
(74) Attorney, Agent, or Firm—Stevens, Davis, Miller & Mosher, LLP

(57) ABSTRACT

In its broadest embodiment, the invention contemplates an apparatus for multi-phase vacuum extraction and a method for using the apparatus. The apparatus primarily includes: a first substantially vertically oriented conduit having an upper end and a closed lower end; the upper end including a vacuum suction port; a second substantially vertically oriented conduit having an open upper end and a lower end; the lower end having plural openings spaced from the lowest point to the highest point thereof. The second substantially vertically oriented conduit is axially disposed within the first substantially vertically oriented conduit; and, a seal is disposed between the outer surface of the upper end of the second substantially vertically oriented conduit, and the inner surface of the upper end of the first substantially vertically oriented conduit below the vacuum suction port. Preferably, an entrainment air inlet port can be provided below the in the first substantially vertically oriented conduit below the elevational level of the seal. The method of the invention involves manipulating the apparatus so that a multi-phase effluent is withdrawn from the vacuum suction port when the closed end is positioned through a level of liquid between the highest point and the lowest point; and, a vacuum is drawn on the vacuum suction port.

20 Claims, 8 Drawing Sheets

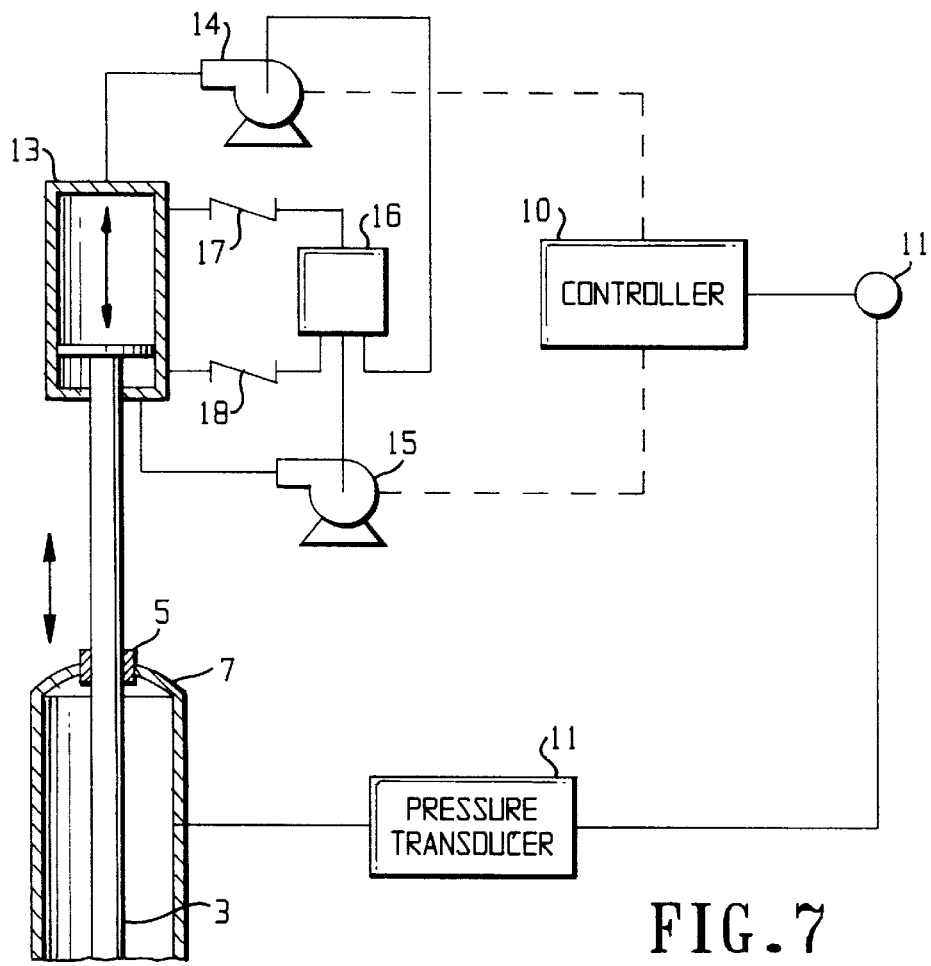
FIG. 7
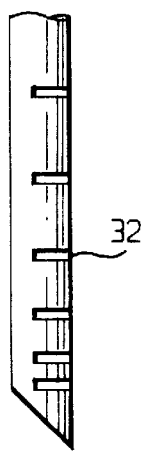   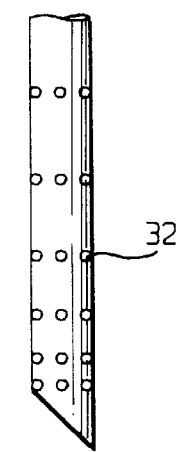   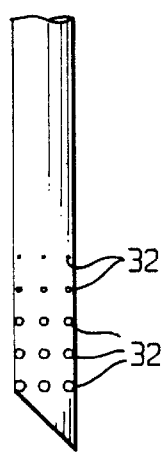   
FIG. 8A    FIG. 8B    FIG. 8C    FIG. 8D

 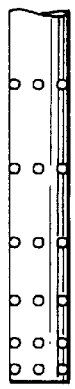  
FIG. 9A  FIG. 9B  FIG. 9C  FIG. 9D
   
ENDCAP (TYP)
FIG. 10A  FIG. 10B  FIG. 10C  FIG. 10D

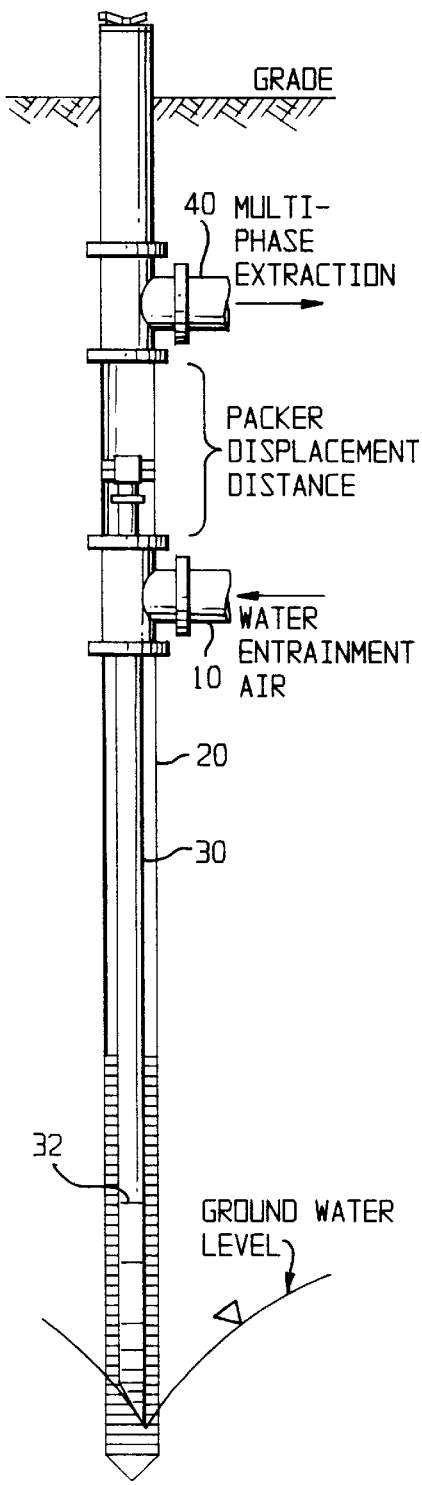

MOST BASIC OPERATION, NO NAPL PRESENT AT SITE.

THIS LINE UNDER VACUUM, EXTRACTING NAPL SOME GROUNDWATER, SOME SOIL VAPOR.

A. AT THE BEGINNING OF OPERATION, THE AIR-INLET LINE CAN BE OPERATED VARIOUS WAYS UNDER DIFFERENT CONDITIONS WHEN THE DROP TUBE IS SET.

1. ABOVE VACUUM-LIFT LIMITS THE AIR-INLET CAN BE CLOSED, OPEN TO ATMOSPHERE OR UNDER PRESSURE GREATER THAN ATMOSPHERE.

2. BELOW VACUUM-LIFT LIMITS THE AIR-INLET LINE CAN BE OPEN TO ATMOSPHERE OR UNDER A PRESSURE GREATER THAN ATMOSPHERE.

B. FOLLOWING START-UP, THE AIR-INLET LINE CAN BE OPERATED IN VARIOUS WAYS, WHERE THE DROP TUBE IS SET.

1. ABOVE OR BELOW VACUUM-LIFT LIMITS THE AIR-INLET LINE IS TYPICALLY CLOSED. HOWEVER, THE AIR-INLET LINE CAN ALSO BE LEFT OPEN TO ATMOSPHERE, UNDER PRESSURE GREATER THAN ATMOSPHERE OR A PRESSURE LESS THATN ATMOSPHERIC.

A SECOND PUMP IS USED TO PROVIDE PRESSURIZED AIR.

EXTENDS TRADITIONAL SOIL-VAPOR EXTRACTION TO SOILS

OPERATIONAL GOAL:
    MAXIMIZE DRAWDOWN, EXPOSING "SMEAR ZONE"
    MAXIMIZE SOIL-VAPOR RECOVERY IN "SMEAR ZONE"
    MAXIMIZE OXYGEN CONTENT OF VADOSE ZONE FOR
        AEROBICALLY DEGRADABLE CONTAMINANTS

DROP TUBE SETTING:
    NEAR BASE OF OUTER CASING 20

PACKER DISPLACEMENT DISTANCE 120 AND LENGTH DROP TUBE OPENINGS 110:
    DEPENDENT UPON SITE-SPECIFIC DATA SUCH AS
    HISTORICAL GROUND-WATER FLUCTUATIONS

FIG. 11

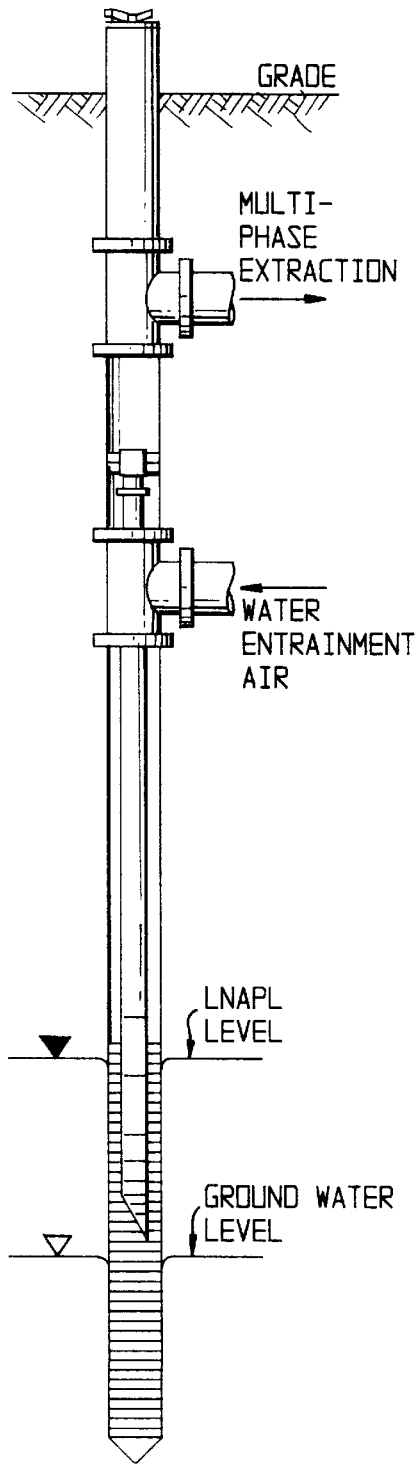

FOR SITES HAVING LNAPL, THE OPERATIONAL SCHEME DESCRIBED ON THIS FIGURE IS TYPICALLY FOLLOWED. USUALLY, THE PACKER IS PLACED SUCH THAT THE BASE OF THE DROP TUBE AND TUBE OPENING IS LOCATED WITHIN THE NAPL FOUND ON TOP OF THE WATER TABLE.

THIS LINE UNDER VACUUM, EXTRACTING NAPL SOME GROUNDWATER, SOME SOIL VAPOR.

A. AT THE BEGINNING OF OPERATION, THE AIR-INLET LINE CAN BE OPERATED VARIOUS WAYS UNDER DIFFERENT CONDITIONS WHEN THE DROP TUBE IS SET.

1. ABOVE VACUUM-LIFT LIMITS THE AIR-INLET CAN BE CLOSED, OPEN TO ATMOSPHERE OR UNDER PRESSURE GREATER THAN ATMOSPHERE.

2. BELOW VACUUM-LIFT LIMITS THE AIR-INLET LINE CAN BE OPEN TO ATMOSPHERE OR UNDER A PRESSURE GREATER THAN ATMOSPHERIC.

B. FOLLOWING START-UP, THE AIR-INLET LINE CAN BE OPERATED IN VARIOUS WAYS, WHERE THE DROP TUBE IS SET.

1. ABOVE OR BELOW VACUUM-LIFT LIMITS THE AIR-INLET LINE IS TYPICALLY CLOSED. HOWEVER, THE AIR-INLET LINE CAN ALSO BE LEFT OPEN TO ATMOSPHERE, UNDER PRESSURE GREATER THAN ATMOSPHERE OR A PRESSURE LESS THAN ATMOSPHERIC.

A SECOND PUMP IS USED TO PROVIDE PRESSURIZED AIR.

OPERATIONAL GOAL:
    MAXIMIZE LNAPL RECOVERY
    MINIMIZE GROUND-WATER RECOVERY
    MINIMIZE SOIL-VAPOR RECOVERY

DROP TUBE SETTING LENGTH 110:
    APPROXIMATE LENGTH OF NAPL LAYER THICKNESS

PACKER DISPLACEMENT DISTANCE:
    DEPENDENT UPON HISTORICAL GROUND-WATER LEVEL FLUCTUATIONS.

FIG.12

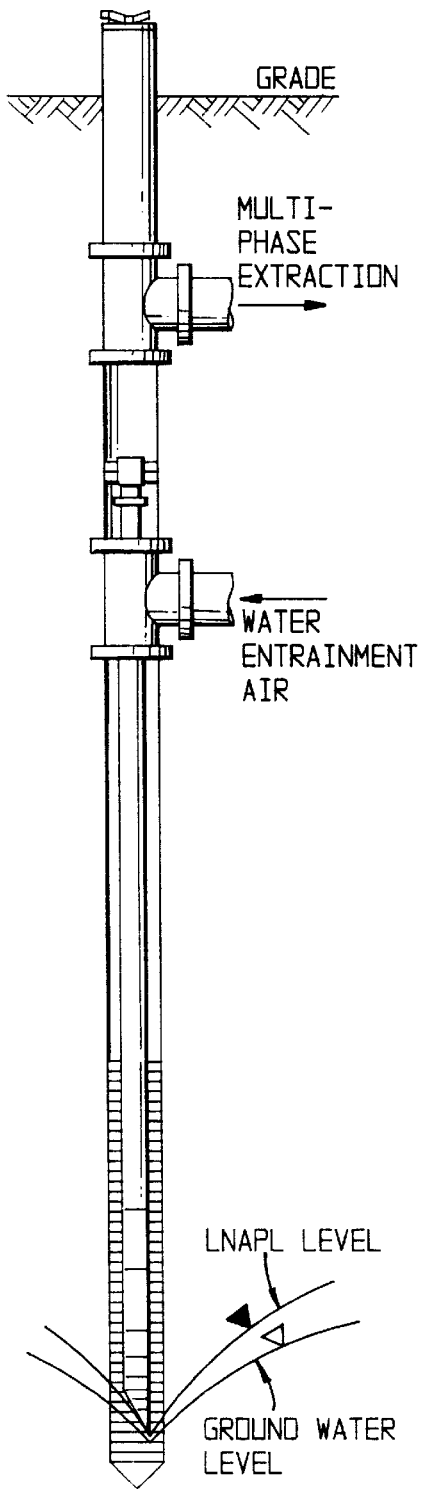

AFTER NAPL RECOVERY HAS REACHED LOW LEVELS USING THE OPERATIONAL METHODS DESCRIBED IN FIGURE 12, THE DROP TUBE 30 WILL BE VERTICALLY DISPLACED DOWNWARD TO BASE OF OUTER CASING 20 TO PRODUCE MAXIMUM GROUNDWATER DRAWDOWN, THEREBY EXTENDING TRADITIONAL SVE TO THE PREVIOUSLY SATURATED SOILS THAT ARE USUALLY THE MOST CONTAMINATED SOILS, COMMONLY REFERRED TO AS THE "SMEAR ZONE."

THIS LINE UNDER VACUUM, EXTRACTING NAPL, SOME GROUNDWATER, SOME SOIL VAPOR.

A. AT THE BEGINNING OF OPERATION, THE AIR-INLET LINE CAN BE OPERATED VARIOUS WAYS UNDER DIFFERENT CONDITIONS WHEN THE DROP TUBE IS SET.

1. ABOVE VACUUM-LIFT LIMITS THE AIR-INLET CAN BE CLOSED, OPEN TO ATMOSPHERE OR UNDER PRESSURE GREATER THAN ATMOSPHERE.

2. BELOW VACUUM-LIFT LIMITS THE AIR-INLET LINE CAN BE OPEN TO ATMOSPHERE OR UNDER A PRESSURE GREATER THAN ATMOSPHERIC.

B. FOLLOWING START-UP, THE AIR-INLET LINE CAN BE OPERATED IN VARIOUS WAYS, WHERE THE DROP TUBE IS SET.

1. ABOVE OR BELOW VACUUM-LIFT LIMITS THE AIR-INLET LINE IS TYPICALLY CLOSED. HOWEVER, THE AIR-INLET LINE CAN ALSO BE LEFT OPEN TO ATMOSPHERE, UNDER PRESSURE GREATER THAN ATMOSPHERE OR A PRESSURE LESS THATN ATMOSPHERIC.

A SECOND PUMP IS USED TO PROVIDE PRESSURIZED AIR.

OPERATIONAL GOAL:
    MAXIMIZE GROUND-WATER RECOVERY
    MAXIMIZE DRAWDOWN, EXPOSED "SMEAR ZONE"
        SIGNIFICANT LNAPL RECOVERY
    MAXIMIZE SOIL-VAPOR RECOVERY THROUGH PREVIOUSLY SATURATED SMEAR ZONE
    MAXIMIZE OXYGEN CONTENT OF VADOSE ZONE FOR
        CONTAMINANTS THAT ARE AEROBICALLY DEGRADABLE

DROP TUBE SETTING:
    NEAR BASE OF OUTER CASING 20

FIG. 13

VACUUM EXTRACTION APPARATUS AND PROCESS

BACKGROUND OF THE INVENTION

1. Field of the Invention

The present invention relates to a vacuum extraction apparatus and process for multi-phase extraction.

2. Background Discussion

The major problems associated with the existing multi-phase extraction (MPE) inventions are twofold:

I) The existing inventions cannot adjust to changes in water levels that are below 25 feet below grade level (bgl) without sacrificing simplicity, efficiency or effectiveness.

ii) The present prior art inventions typically embody a complicated connection between the air inlet port and the internal drop tube well casing, that makes it substantially more difficult and expensive to construct and adjust.

3. Summary

At many industrial and commercial facilities and at waste handling and disposal sites, soil and groundwater are contaminated with chemicals adsorbed in the soil and dissolved in the groundwater. A variety of techniques have been used for removal of soil contaminants and remediation of affected soil. One common technique involves the excavation and off-site treatment of the soil. Another technique involves saturating the contaminated soil with water in situ, causing the contaminants to be slowly leached from the soil by the water. The contaminated water can then be removed.

Techniques have also been proposed for removing volatile organic contaminants from soil by vacuum extraction. Typically, a vacuum is applied in a borehole at the level of the water table, the assumption being that a contaminant such as gasoline, which is less dense than water, would float on the water table and present a layer which could be drawn off by vacuum applied to the liquid at or around that level. Another prior art scheme, exploits two phase vacuum extraction, a single vacuum device removes contaminants in both the water and the soil gases by way of a single conduit formed by the well casing. However, none of the foregoing systems are designed to effectively accommodate variations in the groundwater level, and operate substantially beyond conventional vacuum limits, while retaining the simplicity and cost effectiveness of standard vacuum extraction systems.

Others have suggested the possibility of venting soil above the water table (i.e., in the vadose zone) to cause volatilization of the contaminant in the soil, and then drawing off the contaminant in the vapor phase. Thus, conventional vacuum extraction systems are designed to remediate the vadose zone by applying vacuum to draw air to the soil through wells having screening which does not extend below the water table.

It would be desirable to provide an apparatus and process to overcome these limitations. More specifically, it would be desirable to provide an apparatus and process that can effectively accommodate variations in the groundwater level. Further, it would be of great advantage to provide an apparatus and process that maximizes drawdown of groundwater in a well and enables effective operation substantially beyond conventional vacuum limits while retaining the simplicity and cost effectiveness of standard vacuum extraction systems.

Contaminants can exist in subsurface soil and groundwater in a non-aqueous phase liquid adsorbed to soil and mixed with and/or dissolved in groundwater and soil gases. Various contaminants can be found in groundwater and soil, such as volatile compounds, including volatile organic compounds, nonvolatile materials, metal contaminants, and the like. Such contaminants can be found and remediated in the vadose (unsaturated) zone found between the surface of the search and the water table, at the interface between the vadose zone and the water table, and in the saturated zone below the water table.

At many industrial and commercial facilities and at waste handling and disposal sites, soil and groundwater are contaminated with suspended or water-soluble chemicals or both. A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed.

Further exemplary of these techniques are the following United States Patents. They are incorporated herein in their entireties and cited in greater part to enable the person of ordinary skill to practice the instant invention.

Techniques have also been proposed for removing volatile organic contaminants from soil by vacuum extraction. For example, in U.S. Pat. No. 4,323,122, as noted above, it was proposed that a vacuum be applied in a borehole at the level of the water table, the assumption being that a contaminant such as gasoline, which is less dense than water, would float on the water table and present a layer that could be drawn off by vacuum applied to the liquid at or around that level. U.S. Pat. No. 4,323,122 (Knopik) discloses a system and method for recovering organic liquid such as gasoline which has settled on the water table in underground areas. The systems comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Through a method called soil-vapor extraction, others have suggested the possibility of venting soil above the water table (i.e., in the vadose zone) to cause vaporization of the contaminant in the soil, and then drawing off the contaminant in the vapor phase. Through another method called vacuum enhanced groundwater recovery, groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. No. 4,660,639 (Visser et al), the disclosure of which is totally incorporated herein by reference, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well. The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Mass", Air & Waste Management Association, Vol. 39, No. 8, pages 1054 to 1062 (1989), the disclosure of which is totally incorporated herein by reference, discloses an evaluation of an in situ vacuum extraction process. The process entails removal of contaminants from the vadose zone by vacuum. Wells are installed in the contaminated soil located above the watertable. A vacuum pump or blower induces air flow through the soil, stripping and volatilizing volatile organic compounds from the soil matrix into the air stream. Liquid water, if present in the soil, is also extracted along with the contamination. The stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. No. 4,593,760 (Visser et al) the disclosure of which is totally incorporated herein by reference, and U.S. Reissue Pat. No. Re. 33,102, the disclosure of which is totally incorporated herein by reference, also disclose processes for removal of volatile contaminants from the vadose zone of contaminated ground by pumping volatilized contaminants from the vadose zone using one or more vacuum extraction wells.

U.S. Pat. No. 5,709,505 discloses a process for removing contaminants from a contaminated area of the subsurface which comprises providing a borehole in the contaminated area; placing in the borehole a perforated riser pipe inside of which is situated a vacuum extraction pipe with an opening situated within the perforated riser pipe, wherein a packing is situated in a portion of the annular space between the vacuum extraction pipe and the perforated riser pipe; applying a vacuum to the vacuum extraction pipe to draw gases and liquid from the subsurface into the perforated riser pipe below the packing and from the riser pipe into the vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Also disclosed is an apparatus for carrying out the disclosed process.

U.S. Pat. No. 5,076,360 (Morrow), disclosure of which is totally incorporated herein by reference, discloses methods and apparatus for vacuum extraction of contaminants from the ground which, in a preferred embodiment, entails vacuum withdrawal of liquid and gaseous phases as a common stream, separation of the liquid and gaseous phases, and subsequent treatment of the separated liquid and gases to produce clean effluent. A primed vacuum extraction employs a single vacuum generating device to remove contaminants in both the liquid stream and soil gases through a single well casing utilizing a priming tube which introduces air or other gas to the liquid collected at the bottom of a well. The method permits vacuum extraction of both liquids and gases from the subsurface by way of wells having a liquid layer which is more than thirty feet below the soil surface or in which a screened interval of the extraction pipe is entirely below the liquid surface.

SUMMARY OF THE INVENTION

It is an object of the invention to provide to provide an apparatus and process that provides substantial improvements in the art of multi-phase extraction (MPE).

It is a further object of the invention to provide an apparatus and process that can effectively accommodate variations in the groundwater level.

It is a further object of the invention to provide an apparatus and process that maximizes drawndown of groundwater in a well.

It is a further object of the invention to provide an apparatus and process that enables effective operation substantially beyond conventional vacuum limits, at depths below vacuum-lift limits.

BRIEF DESCRIPTION OF THE DRAWINGS

FIG. 7 shows an automatic control system applicable to the smooth seal variant depicted in FIG. 5.

FIG. 8a shows the preferred embodiment of the graduated entrained water openings positioned at the lowest end of the drop tube end of the invention.

FIG. 8b shows a first variant of the graduated entrained water openings positioned at the lowest end of the drop tube end of the invention.

FIG. 8c shows a second variant of the graduated entrained water openings positioned at the lowest end of the drop tube end of the invention.

FIG. 8d shows a third variant having no openings.

FIG. 9a shows a drop tube having a flat end as applied to the variant depicted in FIG. 8a.

FIG. 9b shows a drop tube having a flat end as applied to the variant depicted in FIG. 8b.

FIG. 9c shows a drop tube having a flat end as applied to the variant depicted in FIG. 8c.

FIG. 9d shows a drop tube having a flat end as applied to the variant depicted in FIG. 8d.

FIG. 10a shows a drop tube having a flat capped end as applied to the variant depicted in FIG. 8a.

FIG. 10b shows a drop tube having a flat capped end as applied to the variant depicted in FIG. 8b.

FIG. 10c shows a drop tube having a flat capped end as applied to the variant depicted in FIG. 8c.

FIG. 10d shows a drop tube having a flat capped end as applied to the variant depicted in FIG. 8d.

FIG. 11 shows a preferred embodiment of the apparatus as applied to a first mode of operation.

FIG. 12 shows a preferred embodiment of the apparatus as applied to a second mode of operation.

FIG. 13 shows a preferred embodiment of the apparatus as applied to a third mode of operation.

DETAILED DESCRIPTION OF THE DRAWINGS

Figure 1:
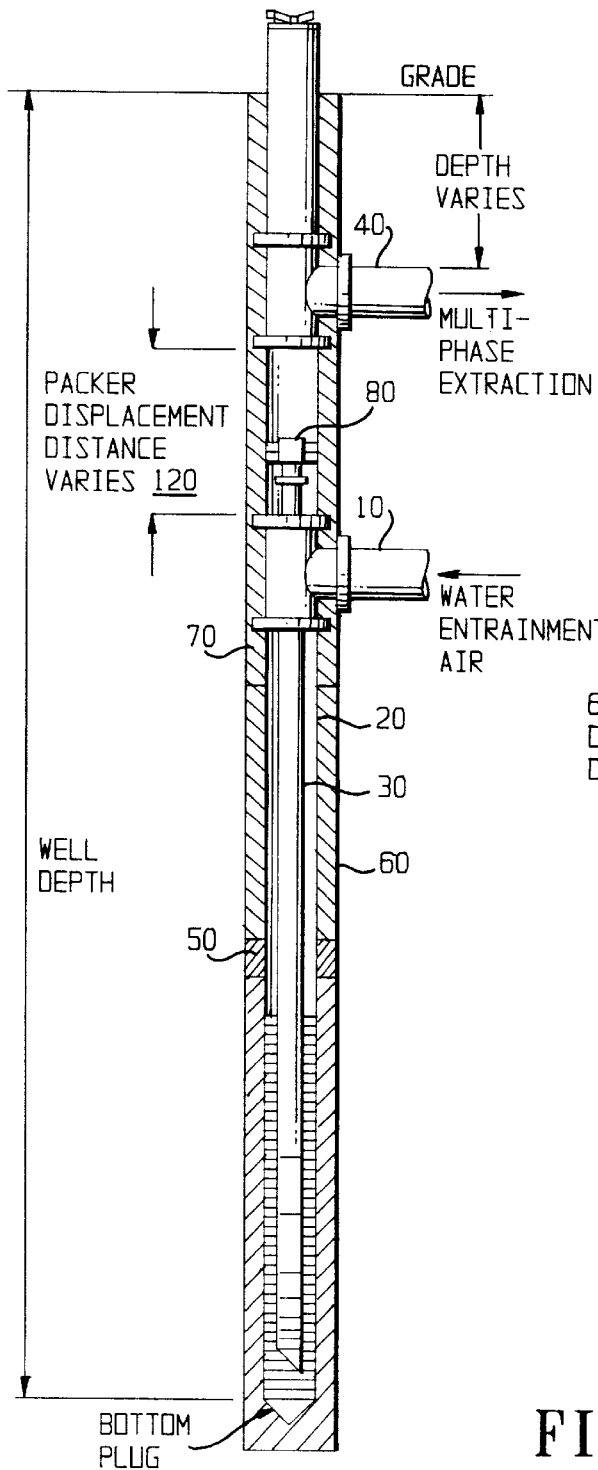
FIG. 1 shows a cutaway fragmentary elevation view of the invention that depicts the major components thereof.
Figure 2:
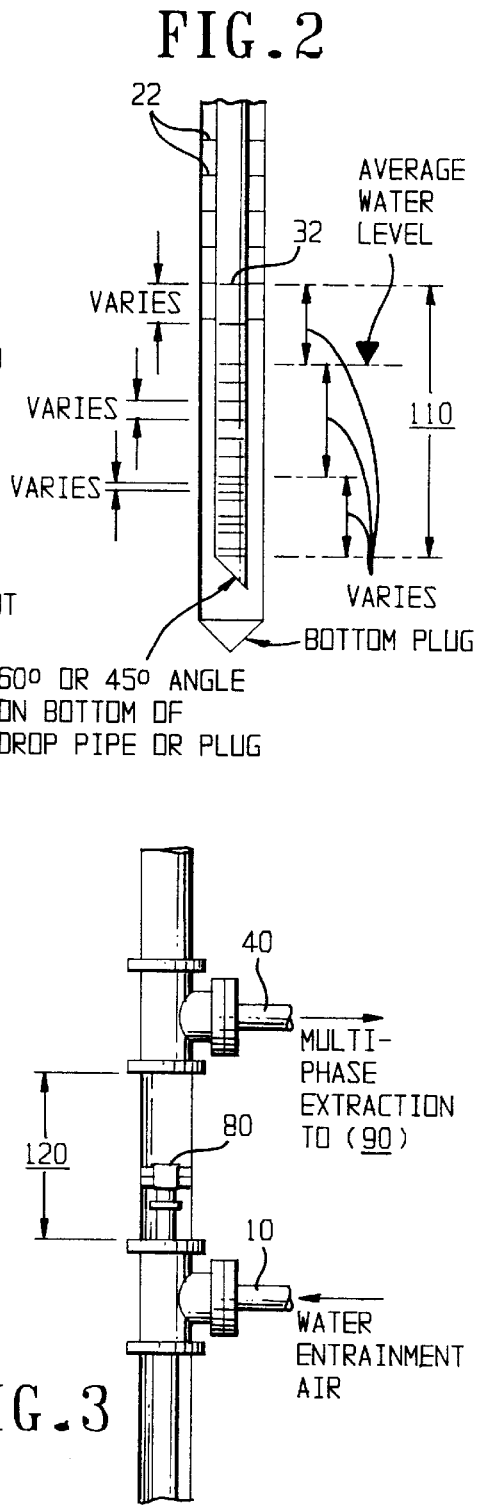
FIG. 2 shows a fragmentary cutaway elevation view showing details of the lower end of the well apparatus of the invention.
Figure 3:
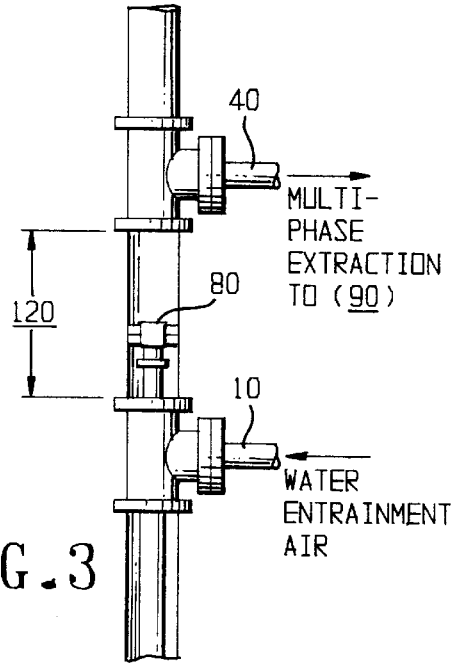
FIG. 3 shows a fragmentary cutaway elevation view showing details of the lower end of the well apparatus of the invention.

As depicted in FIGS. 1 to 3, the MPE well of the present invention comprises several major components, water entrainment air inlet port (10), an outer well (20), a drop tube (30), vacuum suction port (40), a low permeability borehole seal (60) & (70) and well packer(s) (80). The outer well (20) has sidewalls defining inner and outer surfaces. Also, the drop tube (30) has sidewalls defining inner and outer surfaces.

The drop tube (30) is hung within the outer well (20) from the well packer (80). The drop tube is connected to the well only by the packer (80), and it preferably has openings (32) in it near the bottom of the tube (although openings (32) are the preferred embodiment, the invention also contemplates a variant with no openings, as depicted in FIG. 8d). The vacuum suction port (40) is connected to the outer well above the packer (80) and the water-entrainment air inlet port (10) is connected to the outer well beneath the packer (80). The positioning of the water-entrainment inlet port (10) below the level of the well packer(s) (80) is a critical aspect of the invention to aid in maximizing drawdown of groundwater in the well. This creates two distinct zones within the outer well (20). The presence of the two distinct zones allows for the elimination of a down-hole air entrainment pipe, common to prior art MPE inventions. The annular space between the outer well (20) and the drop tube (30) becomes the down-hole air entrainment pipe (10). As described below, the two distinct zones coupled with the drop tube openings (32) overcome problems associated with previous inventions. Utilizing the present invention can result in the installation of smaller, less expensive wells without sacrificing simplicity or effectiveness.

Entrainment air enters inlet pipe (10), and travels down an annular region between outer well (20) and drop tube (30). The air and water with contaminates are then drawn from the lower portion of the outer well (20) up through a drop tube 30 and discharge through a discharge pipe (40). All of the foregoing piping may be constructed of any conventional pipe construction material, including but not limited to, stainless steel, black steel, PVC, CPVC, polyethylene, or the like.

The lower portion of outer well (20) has openings for admitting water and contaminants from surrounding soil (see FIG. 2). Also, a lower portion of drop tube (30) has openings (32) and, in some cases a bottom opening for admitting water, air and contaminants to the drop tube (30) (see FIG. 2).

The outer well 20 openings are numbered as openings 22 on FIG. 2.

FIG. 1 also shows conventional seals (50), (60), and (70). However, movable packer (seals 80 on FIG. 1) is an important aspect of the invention. The drop tube (30), or drop tube (30) and packer (80) are vertically displaceable. The packer (80) defines two discrete areas in the well, one above, and one below the packer (80). Air at or above atmospheric pressure is introduced below the packer seals (80) by entrainment air inlet port (10) and outer well (20). Vacuum is applied by vacuum suction port (40).

Important process parameters, e.g., necessary vacuum pressure range of about 5 in. Hg. (inches of mercury) to about 29 in. Hg., flow rate ranges of various streams of about 0.01 gpm (gallons per minute) to about 20 gpm, for liquids, e.g., groundwater and non-aqueous phase liquids.

Examples of suitable configurations include inflatable bladders, solid rubber, plastic, or metal members, one or more O-rings or other cylindrical rings, dynamic packings such as those employed in hydraulic equipment, piston packings, rod or shaft packings, plunger packings, spring-loaded packings, flange packings, nested V rings, conical rings, soft packings, jamp packings, plastic packings, automatic packings, oil seals, pneumatic or inflatable packings, or the like. A typical packer (80) is a "K-packer" (brand name).

To initiate operation of the apparatus, air is introduced into the water entrainment air inlet port (10) (at either atmospheric or greater than atmospheric pressure). This allows water to be extracted from depths greater than vacuum-lift limitations (~25 feet (bgl)). Shortly after air is introduced below the packer (80), a vacuum pump (90) (connected to the vacuum suction port (40)) is activated. The openings (32) (depicted as slots) in the drop tube (30) are cut such that there is more slots cut near the bottom of the drop tube (30) (FIG. 2). More openings (32) are located at the base of the drop tube (30) to maximize the drawdown of ground-water in the well. This results in more effective remediation. If air at atmospheric pressure is passed into the inlet port (10) then the uppermost openings (32) must be located above the water table if the depth of the water table is deeper than ~25 feet bgl. (NOTE: The openings can be located below the water table if less than ~25 bgl and the system will remain effective. Operation of the instant invention is also contemplated when pressurized air (i.e., above atmospheric pressure) is fed thought inlet port (10) and the openings (32) are all positioned below the groundwater level) The vacuum pump draws the water-entrainment air down through the annular space between the drop tube (30) and the outer well (20), to the openings (32) cut in the drop tube (30). The vacuum pump (90) can be selected from the group comprising, but not necessarily limited to: a water-seal; a liquid ring pump; an oil-seal liquid ring pump; a rotary-vane pump; a rotary lobe pump; a multi-stage regenerative blower; a bladder pump; and, the like. The air then passes through the openings (32) in the drop tube (30) and upward within the drop tube (30) to the vacuum suction port (40). This enables vacuum lift limitations to be overcome in two ways, 1) the air mixes with the liquids, reducing the density of the liquid (water and non-aqueous phase liquids (NAPL)) within the well/drop tube, allowing extraction from greater depths; 2) it also can actually entrain the water and NAPL and help carry it to the vacuum suction port (40) in droplets or slugs. The entrainment process will only occur if sufficient fluid velocities are reached within the drop tube. Typical fluid velocities range from about 1000 fpm (feet per minute) to about 4000 fpm. The water, air and NAPL is then transported through the vacuum suction port (40) where it is separated and treated, disposed or discharged.

The two phase stream extracted from the well can then be processed as known in the art. For example, systems for vacuum extraction and processing a two phase extracted stream is disclosed by U.S. Pat. No. 5,709,505 incorporated herein by reference.

Once the water within the well and well gravel packing has been evacuated from the well, the water-entrainment air pipe is closed (usually automatically and based on a timer). This will result in a build up of vacuum within the well, drawing soil vapor through the outer well screen (which is typically screened across the water table level or below it) and into the openings (32) on the drop tube (30). This soil vapor then takes the place of the water-entrainment air and also results in the remediation of soil that is contaminated with adsorbed volatile compounds. Therefore, this process results in the remediation of NAPL (if present), groundwater and soil, simultaneously.

The unique attributes of the apparatus and process are 1) the drop tube (30) is connected to the outer well (20) in a very simple and easily adjustable way, 2) the apparatus can easily adapt to changes in water table elevations.

In prior art MPE systems, the air entrainment air is introduced via a separate pipe that is located within the drop tube or connected to the base of the drop tube. This configuration makes it difficult to raise or lower the drop tube to adjust to changes in water-table elevation. It can also require the use of a larger diameter well. If a larger diameter well is not installed, then the effectiveness of the process can be reduced due to excessive pressure drops.

The present apparatus and process overcomes both of these problems. The previously discussed shortcomings are overcome through the use of a movable packer (80) and the configuration of the openings (32) on the drop tube (30). As described above, the use of the packer (80) eliminates the need for a down-hole air entrainment pipe, as the annular space between the outer well (20) and the drop tube (30) becomes the down-hole air entrainment pipe.

The packer (80) can be vertically displaced by one person with only a short length of threaded pipe. It is critical to provide a distance between the vacuum suction port (40) and the water-entrainment air inlet port (10). The packer (80) is installed between these two pipes and can be slid up or down between them. This distance is determined based on the historical fluctuations of the water-table elevation. Typical distances between the vacuum suction port (40) and water entrainment inlet port (10) range from about 4 inches to about 20 feet. This component is important as it allows liquid recovery below ~25 feet bgl even when water levels are at the high end of the spectrum.

The length of the drop tube (30) that has openings (32) is also a critical component of the apparatus and process (110) (depicted at FIG. 2). This length is also based on the site-specific ground-water fluctuation and accounts for the smaller normal water-level fluctuations. The packer displacement distance (120) is depicted at FIG. 1. Typical drop tubes have an inside diameter of about 0.5 to about 4.0 inches. Typical outer well has an inside diameter of about 2.0 to about 6.0 inches. The gradation of cross-sectional flow area from the lowermost openings to the uppermost openings of the end of the drop tube (30) is best illustrated by referring to the preferred embodiment that comprises openings in the form slots. Typically, slots (32) comprises a length of about 0.1 to about 12.0 inches and a width of about 0.01 to about 1.0 inches. The number of uppermost slots (32) ranges from about 1 to about 100 per foot to the lowermost slots which range from 1 to 500 per feet drop tube (30). The packer (80) is moved when water-levels fluctuate outside of the more typical range. The openings (32) of the invention are designed to accommodate normal fluctuations in the groundwater level; while the vertically displaceable packer (80) is designed to accommodate atypical or extreme fluctuations in the groundwater level. These facets of the invention become critical when extracting fluids below normal vacuum lift limits.

These apparatus/process components are essential to keep a MPE system running with minimal maintenance. If the bottom of a drop tube (30) (or drop tube openings (32)) is completely submerged at a depth below vacuum-lift limitations, the water or NAPL will not be able to flow up the drop tube (30) and into the suction port or vacuum line (40). Neither water, NAPL nor air will be extracted from the MPE well. If this condition occurs. It requires a site visit to manually adjust the depth of the drop tube. Alternatively, manual adjustment can be avoided where pressurized air is supplied to air inlet (10) or the automated control variants disclosed herein, are used. The depth is adjusted by threading a length of pipe (in one embodiment of the invention) into the top of the packer (80) and moving the packer and the entire drop tube (30) up or down, as desired so that a sufficient number of the openings (32) are above the water level in the outer well (20). The present apparatus/process will eliminate the need to visit the site for all but the most dramatic changes in the water table elevation. Even then these site visits will be minor compared to those required to adjust existing inventions.

Figure 4:
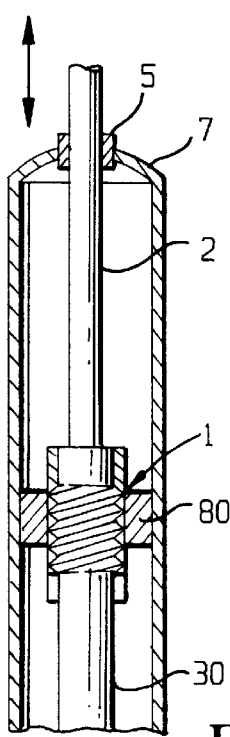
FIG. 4 shows a fragmentary cutaway elevation view showing a threaded seal variant between the drop tube and packer of the invention.

The instant invention contemplates various sealing relationships between the packer seal (80) and the drop tube (30). For example, depicted in FIG. 4 is a preferred variant of the invention that embodies a threaded seal relationship (1) between the packer seal (80) (only one packer seal shown) and the drop tube (30). In this example the packer (80) and drop tube (30) are vertically displaceable in unison within the outer well (20).

Figure 5:
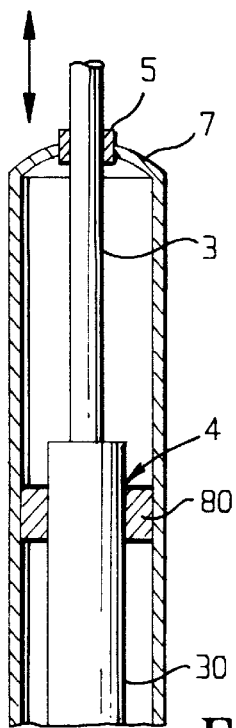
FIG. 5 shows a fragmentary cutaway elevation view showing a smooth seal variant between the drop tube and packer of the invention.

FIG. 5 depicts an alternative variant to FIG. 4. Here a smooth seal (4) is provided between packer seal (80) and drop tube (30). Shown with this variant is vertically displaceable rod (3) fixed to the upper end of drop tube (30) and which passes through grommet seal (6) positioned in the approximate center of well cap (7). In this alternative, the packer (80) remains in a fixed position, while the drop tube (30) is vertically displaced within the packer (80) and outer casing (20).

Figure 6:
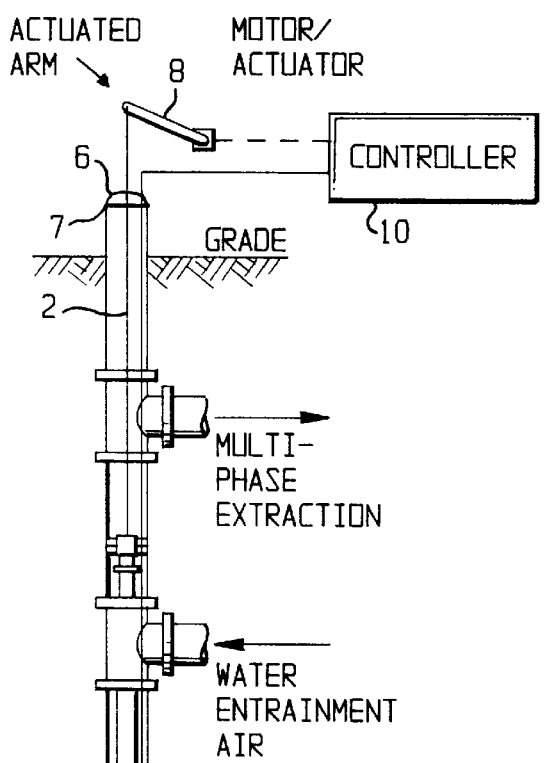
FIG. 6 shows an automatic control system applicable to the threaded seal variant depicted in FIG. 4.

The invention also contemplates various schemes for automatically controlling the vertical elevation of drop tube (30) in relationship to the groundwater level. FIG. 6 shows a control loop variant applicable to the threaded seal relationship depicted in FIG. 4. Depicted is a sensor (11) (typically a pressure transmitter or a pressure transducer); controller (10); activator and arm (8) fixed to the upper end of moveable vertically displaceable rod (8).

FIG. 7 shows a control loop variant applicable to the smooth seal relationship depicted in FIG. 5. The figure depicts control variable sensor (11) (typically a pressure transmitter or a pressure transducer); controller (10); fluid pumps (14) and (15); fluid reservoir (16); check valves (16); and, pneumatic or hydraulic piston (13).

Another important aspect of the invention for maximizing drawndown of groundwater in the well and for permitting operation of the system substantially below conventional vacuum limits is the positioning and arrangement of entrained water inlet openings (32) at the lowest end of the drop tube (30). The common thread of all of the various schemes is the graduation of the net cross-sectional area available for accommodating entrained groundwater from the uppermost openings to the lowermost openings positioned at the end of the drop tube (30). FIG. 8a shows the preferred embodiment. Here the openings (32) are formed of slots of substantially equal cross-sectional area. The vertical space between adjacent slots increases from the lowermost slot to the uppermost. In an alternative to this embodiment (not shown) the vertical space between the slots is constant while cross-sectional area of the slots increases from the lowermost slot to the uppermost.

FIG. 8b shows rows of equally sized circular holes wherein the vertical space between the rows increases from the lowermost row to the uppermost.

FIG. 8c shows rows of circular holes wherein the vertical space between the rows is constant while the size of the holes in a row increases from the lowermost row to the uppermost. Of the foregoing embodiments, vertical graduated spacing of the openings is preferred over vertical graduated cross-sectional area of the openings; and, the preferred geometry of the openings is the slot. Although FIGS. 8b and 8c depict rows, it should be understood that arrangement of the circular openings in rows is not critical to the invention. The circular openings may be arranged in any geometric pattern, merely so long as the net cross-sectional flow area provided by them, gradually increases from the lowest most opening to the highest most opening. Likewise, the geometric shape of the openings is not critical. Thus, the shape can embody any shape other than the slots or circular holes specifically depicted herein.

Depicted in FIG. 8d, is a variant with no openings on the drop tube (30). This alternative is designed to operate primarily in applications where liquids are extracted from a depth greater than vacuum-lift limits.

FIGS. 9a to 9d show the variants of FIGS. 8a to 8d as modified to embody flat end, while FIGS. 10a to 10d show the variants of FIGS. 8a to 8d modified to embody flat capped end.

MODES OF OPERATION

An understanding of the general operation of the apparatus and process of the invention can be readily acquired by referring to FIG. 11. Referring to FIG. 11; a flow path is defined by: the water entrainment port (10); the annular space between drop tube (30) and outer well (20); the openings (or slots) 32 at the lower end of drop tube (30); the interior of drop tube (30); and, the suction outlet port (40). The lower end of drop tube (30) typically includes openings (32) as described above. The end of the drop tube (30) is typically positioned so that the lowermost openings are below the groundwater level and the uppermost openings are above the groundwater level. However, the orientation and the length of the drop tube (30) in the embodiments having openings (32), depends on site-specific conditions such as groundwater level fluctuations; the presence of NAPL, etc. Air is fed through water entrainment port (10) while a vacuum is drawn at suction outlet port (40). The air passes through the annular space between drop tube (30) and outer well 20, where it passes through the openings positioned at and above the groundwater level. Groundwater is in this manner entrained in the air flow and is passed into the interior of the drop tube (30). The entrained groundwater is then carried up the drop tube (30) and is passed through the end thereof into the vacuum suction port (40), and is thus recovered. Continuous operation results in the water in the outer well (20) groundwater being drawn down. After this occurs to a sufficient degree, the air inlet port (10) is closed by means of a valve which is typically automated and based on a timer. Alternatively pressure transducers can be used to automatically perform this function as well.

Referring now to FIGS. 2, 4 and 5; as noted above, the efficiency with which the apparatus and process of the instant invention can draw groundwater down depends in great part on the elevational positioning of the end of the drop tube (30) relative to the groundwater level as shown in FIG. 2. FIG. 4 shows the preferred embodiment wherein the drop tube (30) is in threaded sealed communication with the packer seal (80). Optionally, a vertically displaceable rod (2), which passes through well cap (7) through grommet seal (6), is axially aligned and fixed to the top of drop tube (30). The bottom of the drop tube (30) may be elevationally adjusted relative to the groundwater level merely by moving the rod (2) with an actuator arm. In this alternative, both the packer (80) and the drop tube (30) are moved vertically within the outer casing (20) between the air inlet port (10) and the suction port (40). FIG. 5 shows a variant embodiment wherein the drop tube (30) is in smooth sealed communication with the packer seal (80). Optionally here, a vertically displaceable rod (3), which passes through well cap (7) through grommet seal (6), is fixed to the top of drop tube (30). The bottom of the drop tube (30) may be elevationally adjusted relative to the groundwater level merely by vertically raising or lowering vertically displaceable rod (2). In this alternative the packer (80) remains stationary within the outer casing (20), while the drop tube (30) is vertically displaced.

As also noted above, FIGS. 6 and 7, show examples of automated control as applied to the variants of the invention depicted in FIGS. 4 and 5. Referring more particularly to FIG. 6; as noted above, a control loop applicable to the variant depicted in FIG. 4 is depicted that includes: a control variable sensor (11); a controller (10); and, an actuator (8) that drives an actuator arm and in turn the vertically displaceable rod (2). The control variable is preferably some value characteristics of the groundwater level such as groundwater level or pressure. This value is sensed by sensor (11) and transmitted to controller (10) where a feedback signal is generated and transmitted to the actuator (8) which in turn causes the actuator arm (12) to raise or lower in response to the control variable value.

Referring now to FIG. 7; as noted above, a control loop is depicted that includes: a control variable sensor (11); a controller (10); and, a piston (13) that is driven by pumps (14) or (15). The piston (13); pumps (14) and (15); reservoir (16); piping and check valves depicted in FIG. 7, constitute a closed fluid system. Although the fluid system can either be pneumatic or hydraulic; a pneumatic system is preferred. In this case vertically displaceable rod (3) is axially fixed to the rod of piston (13). As above, the control variable is preferably some value characteristics of the groundwater level such as groundwater level or pressure. This value is sensed by sensor (11) and transmitted to controller (10) where a feedback signal is generated and transmitted to either pump (14) or pump (15). If the control signal causes pump (14) to respond, fluid is pumped into the upper chamber of the housing and fluid to be forced out of the lower chamber of the housing. The piston, and thus rod (3), are thereby pushed downwardly. If the control signal causes pump (15) to respond, then fluid is pumped into the lower chamber of the housing and fluid to be forced out of the upper chamber of the housing. The piston, and thus rod (3), are thereby pushed upwardly. Preferably, all controllers indicated above are progamable microprocessors.

The instant invention is adaptable to a variety of conditions commonly incidental to environmental restoration sites. It can be used to recover NAPL, then used to remediate the "smear zone" (the "smear zone" defines that zone of soil located both above and below the water table that typically contains the most heavily contaminated soil and groundwater) by dewatering a portion of the saturated zone and drawing air through it (i.e., extending traditional SVE below the water table). The invention enables this to occur at both high (depicted at FIG. 14) and low (depicted at FIG. 11) permeability sites.

For the apparatus of FIG. 11, the most basic operation, with no NAPL present at site is as follows.

The line 40, being under vacuum, is for extracting NAPL some groundwater, and some soil vapor.

A. At the beginning of operation, the air-inlet line can be operated various ways under different conditions when the drop tube is set.
  1. Above vacuum-lift limits the air-inlet can be closed, open to atmosphere or under pressure greater than atmosphere.
  2. Below vacuum-lift limits the air-inlet line can be open to atmosphere or under a pressure greater than atmosphere.
B. Following start-up, the air-inlet line can be operated in various ways, where the drop tube is set.
  1. Above or below vacuum-lift limits the air-inlet line is typically closed. However, the air-inlet line can also be left open to atmosphere, under pressure greater than atmosphere or a pressure less than atmospheric.

A second pump is used to provide pressurized air. The apparatus of FIG. 11 extends traditional soil-vapor extraction.

Operational goals of the FIG. 11 apparatus are as follows:

Maximize drawdown, exposing "smear zone",

Maximize soil-vapor recovery in "smear zone", and

Maximize oxygen content of vadose zone for aerobically degradable contaminants.

The drop tube setting is near base of outer casing 20.

Packer displacement distance 120 and length of drop tube openings 110 are dependent upon site-specific data such as historical ground-water fluctuations.

The invention can also be used to recover NAPL from the subsurface as depicted in FIG. 12. Here the base of the drop tube (30) including the portion having plural openings (32) is positioned within the layer of the NAPL in the screen of the outer well (20). This maximizes NAPL recovery by minimizing groundwater drawdown. Excessive drawdown can result in maximum saturation of the surrounding soil with NAPL. The invention also minimizes the amount of contaminated groundwater which must be treated if extracted by the apparatus. After reaching the point of diminishing returns of NAPL recovery by the invention, the drop tube (30) can be lowered toward the base of the screen of the outer well (20) where maximum groundwater drawdown and dewatering can occur.

For sites having LNAPL, the operational scheme described on FIG. 12 is typically followed. Usually, the packer is placed such that the base of the drop tube and tube opening is located within the NAPL found on top of the water table.

The line for multi-phase extraction under vacuum, extracts NAPL some groundwater, and some soil vapor.

A. At the beginning of operation, the air-inlet line can be operated in various ways under different conditions when the drop tube is set.
  1. Above vacuum-lift limits the air-inlet can be closed, open to atmosphere or under pressure greater than atmosphere.
  2. Below vacuum-lift limits the air-inlet line can be open to atmosphere or under a pressure greater than atmospheric.
B. Following start-up, the air-inlet line can be operated in various ways, where the drop tube is set.
  1. Above or below vacuum-lift limits the air-inlet line is typically closed. However, the air-inlet line can also be left open to atmosphere, under pressure greater than atmosphere or a pressure less than atmospheric.

A second pump is used to provide pressurized air.

Operational goals of this apparatus of FIG. 12 are as follows:

Maximize LNAPL recovery,

Minimize ground-water recovery,

Minimize soil-vapor recovery.

Drop tube setting length 110 is to approximate length of NAPL layer thickness.

Packer displacement distance is dependent upon historical ground-water level fluctuations.

As depicted in FIG. 13, this process produces maximum drawndown and groundwater recovery. The drawndown exposes the usually heavily contaminated soil to the influence of the soil-gas flow created by operation of the invention. This results in the remediation of previously saturated soil by extending traditional soil-vapor extraction techniques to contaminated soils beneath the former static water-level elevation. If the contaminant is aerobically biodegradable, the operation of the invention will draw atmospheric air, containing oxygen, into the subsurface thereby providing aerobic microorganisms having the capacity to degrade the particular contaminant involved.

As shown in FIG. 13, after NAPL recovery has reached low levels using the operational methods described in FIG. 12, the drop tube 30 will be vertically displaced downward to base of outer casing 20 to produce maximum groundwater drawdown, thereby extending traditional SVE to the previously saturated soils that are usually the most contaminated soils, commonly referred to as the "smear zone."

In FIG. 13, the multi-phase extraction line under vacuum is extracting NAPL, some groundwater, and some soil vapor.

A. At the beginning of operation, the air-inlet line-can be operated various ways under different conditions when the drop tube is set.
  1. Above vacuum-lift limits the air-inlet can be closed, open to atmosphere or under pressure greater than atmosphere.
  2. Below vacuum-lift limits the air-inlet line can be open to atmosphere or under a pressure greater than atmospheric.
B. Following start-up, the air-inlet line can be operated in various ways, where the drop tube is set.
  1. Above or below vacuum-lift limits the air-inlet line is typically closed. However, the air-inlet line can also be left open to atmosphere, under pressure greater than atmosphere or a pressure less than atmospheric.

A second pump is used to provide pressurized air.

Operational goals of the apparatus of FIG. 13 are as follows:

Maximize ground-water recovery,

Maximize drawdown, exposed "smear zone",

Significant LNAPL recovery,

Maximize soil-vapor recovery through previously saturated smear zone, and

Maximize oxygen content of vadose zone for comtaminants that are aerobically degradable.

Drop tube setting is near base of outer casing 20.

Figure 14:
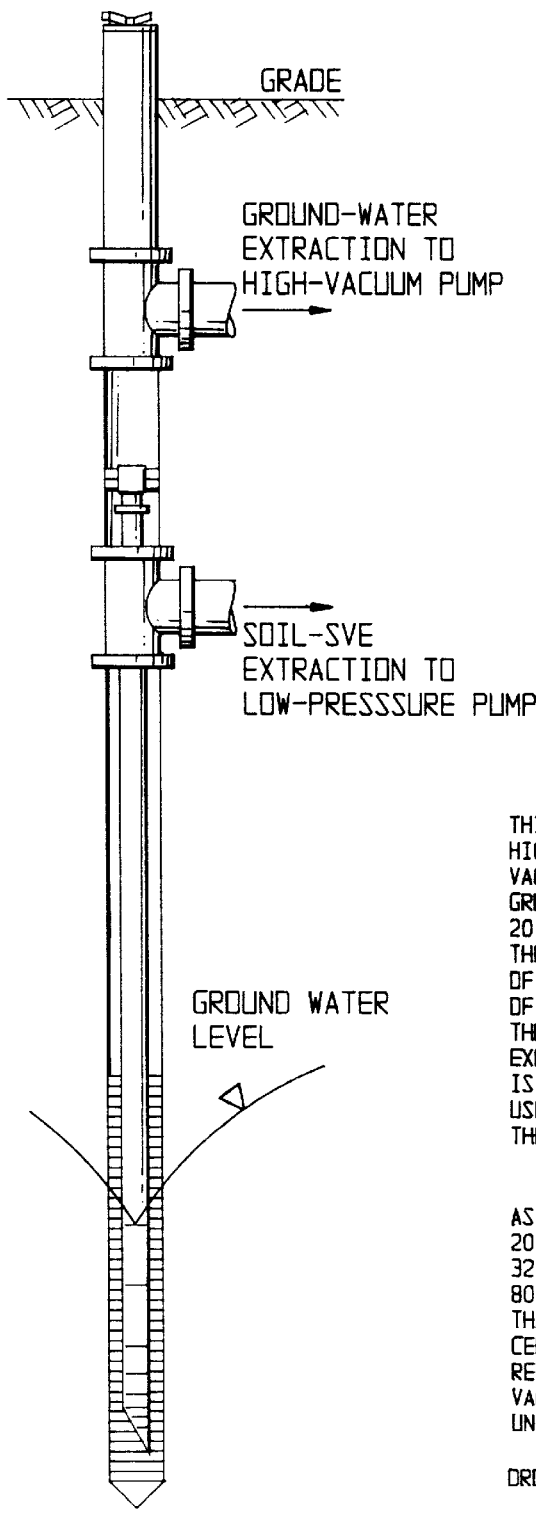
FIG. 14 shows a preferred embodiment of the apparatus as applied to a fourth mode of operation.

FIG. 14 depicts the invention as applied to remediate sites having a relatively high permeability. In this case, the lower end of the drop tube (30) is positioned at the base of the screen of outer well (20) and operated such that only groundwater or dense NAPL is recovered. The uppermost openings (32) are positioned well above and out of contact with the groundwater level. A second vacuum pump is connected to the air inlet port (10) and operated. This mode of operation enables groundwater and/or dense NAPL to be extracted through the drop tube (3) and the suction port (40) through a first vacuum pump, while at the same time, enabling soil vapor to be extracted through the air entrainment port (10) through a second vacuum pump.

As shown in FIG. 14, this operational scheme is for use at sites having higher permeability soils. The drop tube 30 and vacuum suction port 40 are used to remove groundwater. In the variation, the outer casing 20 is usually extended to depths further below the water table surface than normal and the base of the drop tube 30 is lowered to the bottom of the outer casing 20. Extracting groundwater through the drop tube results in drawdown which exposes the "smear zone." A second vacuum pump is connected to the air-inlet port 10 and is used to extract soil-vapor from the portion of the apparatus below the packer 80.

As long as the water-level in the outer casing 20 does not intersect the drop tube openings 32 the vacuum in the apparatus below the packer 80 will be close enough to atmospheric pressure that a relatively low-vacuum pump, such as a centrifugal, rotary-lobe, rotary-vane, or regenerative blower would be able to extract soil vapor from the "smear zone" through the unsaturated portion of the outer casing screen.

In FIG. 14, the drop tube setting is at the base of outer casing 20.

Although the invention has been described with reference to certain preferred embodiments, it will be appreciated that many variations and modifications may be made within the scope of the broad principles of the invention. Hence, it is intended that the preferred embodiments and all of such variations and modifications be included within the scope and spirit of the invention, as defined by the following claims.

What is claimed is:

1. An apparatus for multi-phase vacuum extraction, comprising:

a first substantially vertically oriented conduit having an upper end portion and a lower end portion having a closed lower end, wherein said upper end portion includes a vacuum suction port, wherein said first substantially vertically oriented conduit has sidewalls which define an inner surface at the upper end portion of said first substantially vertically oriented conduit;

a second substantially vertically oriented conduit having an open upper end portion and a lower end portion, wherein said second substantially vertically oriented conduit is axially disposed within said first substantially vertically oriented conduit, wherein said second substantially vertically oriented conduit has sidewalls which define an outer surface at the upper end portion of said second substantially vertically oriented conduit; and a seal disposed between the outer surface of the open upper end portion of said second substantially vertically oriented conduit, and the inner surface of the upper end portion of said first substantially vertically oriented conduit below said vacuum suction port; whereby a multi-phase effluent is capable of being withdrawn from said vacuum suction port when said lower end portion of said first substantially vertically oriented conduit and said lower end portion of said second substantially vertically oriented conduit are positioned through a level of liquid, and a vacuum is drawn on said vacuum suction port.

2. The apparatus of claim 1, wherein said lower end portion further comprises plural openings spaced from the lowest point to the highest point of said lower end portion; said plural opening characterized by cross-sectional flow area which is gradated to decrease from the lowest point to the highest point of said lower end portion; whereby the multi-phase effluent is withdrawn from said vacuum suction port when said lower end portion is positioned through a level of liquid between said highest point and said lowest point, and a vacuum is drawn on said vacuum suction port.

3. The apparatus of claim 2, wherein said plural openings comprise plural horizontal slots.

4. The apparatus of claim 3, wherein the cross-sectional area of each of said plural horizontal slots is constant and the spacing between adjacent of said plural horizontal slots gradates to increase from the lowest point to the highest point of said lower end portion.

5. The apparatus of claim 3, wherein the cross-sectional area of each of said plural horizontal slots gradates to decrease from the lowest point to the highest point of said lower end portion and the spacing between adjacent of said plural horizontal slots is constant.

6. The apparatus of claim 2, wherein said plural openings comprise an array of circular holes.

7. The apparatus of claim 6, wherein said the cross-sectional area of each of said circular holes is constant and wherein the spacing between adjacent of said circular holes gradates to increase from the lowest point to the highest point of said lower end portion.

8. The apparatus of claim 6, wherein said the cross-sectional area of each said circular holes gradates to decrease from the lowest point to the highest point of said lower end portion and wherein the spacing between adjacent of said circular holes is constant.

9. The apparatus of claim 1, wherein the seal is located at a vertical elevation level with respect to a longitudinal axis of the first substantially vertically oriented conduit, further comprising a gas inlet port disposed in said first substantially vertically oriented conduit below the vertical elevation level of said seal.

10. The apparatus of claim 1, further comprising a mechanical arrangement for enabling said second substantially vertically oriented conduit to be vertically displaced relative to said seal and first substantially vertically oriented conduit.

11. The apparatus of claim 10, further comprising an arrangement for automatically controlling said mechanical arrangement.

12. The apparatus of claim 11, wherein:

said seal is in smooth sealing engagement with the outer surface of said second substantially vertically oriented conduit;

said mechanical arrangement comprises a vertically displaceable rod fixed to said second substantially vertically oriented conduit; and said arrangement for automatically controlling comprises:

a control loop comprising:

a control variable sensor for generating a control signal;

a controller for receiving said control signal and generating a controlling signal in response thereto; and a closed system fluid piston arrangement for moving said vertically displaceable rod parallel to a vertical axis.

13. The apparatus of claim 12, wherein said closed system fluid piston arrangement comprises:
   a substantially closed cylinder housing having a piston disposed therein defining an upper chamber and a lower chamber;
   a fluid reservoir;
   a first pump for controlledly feeding fluid from said fluid reservoir to said upper chamber in response to said controlling signal;
   a second pump for controlledly feeding fluid from said fluid reservoir to said lower chamber in response to said controlling signal;
   a first fluid return conduit including a first check valve disposed therein for feeding fluid from said upper chamber to said fluid reservoir; and,
   a second fluid return conduit including a second check valve disposed therein for feeding fluid from said upper chamber to said fluid reservoir.

14. The apparatus of claim 11, wherein said arrangement for automatically controlling comprises a programmable microprocessor.

15. The apparatus of claim 1, further comprising a mechanical arrangement for enabling said second substantially vertically oriented conduit and said seal to be vertically displaced relative to said first substantially vertically oriented conduit.

16. The apparatus of claim 15, further comprising an arrangement for automatically controlling said mechanical arrangement.

17. The apparatus of claim 16, wherein:
   said seal is in threaded sealing engagement with the outer surface of said second substantially vertically oriented conduit;
   said mechanical arrangement comprises an actuated arm aligned and fixed to the radial axis of said second substantially vertically oriented conduit; and
   said arrangement for automatically controlling comprises:
      a control loop comprising:
         a control variable sensor for generating a control signal;
         a controller for receiving said control signal and generating a controlling signal in response thereto; and,
         an actuated motor including an actuated arm for controlledly vertically displacing said seal and said second substantially vertically oriented conduit in response to said control signal.

18. The apparatus of claim 16, wherein said arrangement for automatically controlling comprises a programmable microprocessor.

19. A method for multi-phase vacuum extraction, comprising:
   providing an apparatus comprising:
      a first substantially vertically oriented conduit having an upper end portion and a lower end portion, said upper end portion including a vacuum suction port, wherein said first substantially vertically oriented conduit has sidewalls which define an inner surface at the upper end portion of said first substantially vertically oriented conduit;
      a second substantially vertically oriented conduit having an open upper end portion and a lower end portion, said lower end portion having plural openings spaced from the lowest point to the highest point thereof, wherein said second substantially vertically oriented conduit has sidewalls which define an outer surface at the upper end portion of said second substantially vertically oriented conduit;
      wherein said plural openings are characterized by cross-sectional flow area which is gradated to increase from the lowest point to the highest point of said lower end portion; and wherein said second substantially vertically oriented conduit is axially disposed within said first substantially vertically oriented conduit;
      a seal disposed between the outer surface of the upper end portion of said second substantially vertically oriented conduit, and the inner surface of the upper end portion of said first substantially vertically oriented conduit below said vacuum suction port; and
      a gas inlet port disposed in said first substantially vertically oriented conduit below an elevation level of said seal;
   positioning said end portion of said second substantially vertically oriented conduit through a level of liquid between said highest point and said lowest point; and,
   drawing a vacuum on said vacuum suction port sufficient to withdraw a multi-phase effluent from said vacuum suction port.

20. An apparatus for removing contaminants from a contaminated area of a subsurface comprising:
   a riser pipe extending downwardly from the surface and having a perforated lower portion;
   a drop tube located within said riser pipe, said drop tube having a lower portion having an open end and having perforations, and having an upper open end;
   a movable seal,
   wherein said drop tube is held within said riser pipe by said movable seal to be movable along a longitudinal axis of the drop tube, wherein said movable seal separates a first atmosphere of the riser pipe below said movable seal from a second atmosphere of the riser pipe above said movable seal;
   said riser pipe having an inlet for feeding entrainment gas to the first atmosphere of said riser pipe;
   said riser pipe having an outlet for drawing a vacuum from said second atmosphere of said riser pipe; and
   a vacuum forming apparatus in fluid communication with the riser pipe outlet, the upper portion of riser pipe in fluid communication with the drop tube upper end, and adapted to form a zone of reduced pressure in the subsurface around the riser pipe below the movable seal,
   whereby gases and liquid are drawable from the subsurface into the riser pipe below the movable seal and into the drop tube and conveyed to the surface as a common stream, said drawn gases including those in the contaminated area and entrainment gas.

* * * * *